US009971755B2

United States Patent
Chi et al.

(10) Patent No.: US 9,971,755 B2
(45) Date of Patent: May 15, 2018

(54) SELECTING ADDITIONAL SUPPLEMENTAL CONTENT FOR PRESENTATION IN CONJUNCTION WITH A CONTENT ITEM PRESENTED VIA A DIGITAL MAGAZINE

(71) Applicant: Flipboard, Inc., Palo Alto, CA (US)

(72) Inventors: Sang Chi, Burlingame, CA (US); Yuechen Zhao, Cambridge, MA (US); Ben Frederickson, Vancouver (CA)

(73) Assignee: Flipboard, Inc., Palo Alto, CA (US)

( * ) Notice: Subject to any disclaimer, the term of this patent is extended or adjusted under 35 U.S.C. 154(b) by 371 days.

(21) Appl. No.: 14/613,289

(22) Filed: Feb. 3, 2015

(65) Prior Publication Data

US 2016/0224557 A1 Aug. 4, 2016

(51) Int. Cl.
G06F 17/00 (2006.01)
G06F 17/24 (2006.01)
G06F 17/30 (2006.01)

(52) U.S. Cl.
CPC ...... G06F 17/248 (2013.01); G06F 17/30867 (2013.01); G06F 17/30893 (2013.01)

(58) Field of Classification Search
CPC .................... G06F 17/30011; G06F 17/30867
See application file for complete search history.

(56) References Cited

U.S. PATENT DOCUMENTS

| 8,370,348 | B1* | 2/2013 | Reilly | ..................... | G06Q 30/02 707/731 |
| 9,098,572 | B1* | 8/2015 | Reilly | | |
| 2013/0268526 | A1* | 10/2013 | Johns | ................. | G06F 17/30873 707/730 |
| 2014/0297655 | A1* | 10/2014 | Paglia | ..................... | H04L 67/22 707/748 |
| 2015/0370331 | A1* | 12/2015 | Gonzales, Jr. | .......... | G06F 3/013 345/156 |
| 2016/0070731 | A1* | 3/2016 | Chang | ................. | G06F 17/3089 707/741 |
| 2016/0085729 | A1* | 3/2016 | Chi | ......................... | G06F 17/24 715/202 |
| 2016/0085730 | A1* | 3/2016 | Chang | ..................... | G06F 17/24 715/202 |
| 2016/0124911 | A1* | 5/2016 | Ying | ..................... | G06F 17/212 715/238 |
| 2016/0124918 | A1* | 5/2016 | Ying | ..................... | G06F 17/248 715/234 |
| 2016/0202861 | A1* | 7/2016 | Weskamp | ............. | G06F 3/0346 715/719 |

(Continued)

*Primary Examiner* — Stephen Hong
*Assistant Examiner* — Gregory Vaughn
(74) *Attorney, Agent, or Firm* — Fenwick & West LLP

(57) ABSTRACT

A digital magazine server provides a digital magazine including content items to a client device for presentation to a user. To increase user interaction with the digital magazine, the digital magazine server identifies a content item in the digital magazine and determines one or more topics associated with the identified content item. From the one or more topics, the digital magazine server identifies a topic and obtains candidate content items that are also associated with the identified topic. A candidate content item is selected from the candidate content item and the selected candidate content item is presented in conjunction with the identified content item.

16 Claims, 3 Drawing Sheets

(56) References Cited

U.S. PATENT DOCUMENTS

2016/0203112 A1\* 7/2016 Asamani ................ H04W 4/12
                                                            715/205
2016/0205173 A1\* 7/2016 Garofalo ................ H04L 67/02
                                                            709/217

\* cited by examiner

SELECTING ADDITIONAL SUPPLEMENTAL CONTENT FOR PRESENTATION IN CONJUNCTION WITH A CONTENT ITEM PRESENTED VIA A DIGITAL MAGAZINE

BACKGROUND

This invention relates generally to content presented via digital magazines, and more specifically to identifying additional content related to a content item in a digital magazine for presentation with the content item.

A digital magazine identifies content items for presentation, with many content items often identified based on user-defined preferences or parameters. As a user interacts with content items presented in a digital magazine, the user's interactions may be used to identify additional content items for presentation to the user via the digital magazine. However, a significant amount of additional content may be related to, or otherwise associated with, content items presented by the digital magazine. Additional content related to a content item presented by the digital magazine may increase the likelihood of the user interacting with the content item, or with the digital magazine, if presented to the user in the digital magazine along with the content item. However, conventional methods for generating a digital magazine relying on user interactions to select content fail to present certain content that may further increase user interaction with the digital magazine.

SUMMARY

A digital magazine server retrieves content from one or more sources and generates a personalized, customizable digital magazine for a user based on the retrieved content. The digital magazine server organizes content items having at least one common characteristic into various sections based on page templates describing the relative positioning of content items to each other. Content items are presented to the user according to the sections. For a content item presented to the user in a section, the digital magazine server may include supplemental content, such as an additional content item or a portion of an additional content item, in a location of the section used to present the content item. For example, the section presents the content item in a content region and also presents the additional content item in a portion of the content region or in a content region adjacent to the content region presenting the content item.

To present additional content along with a content item presented in a digital magazine, the digital magazine server identifies the content item. For example, the digital magazine server identifies the content item based on information stored in a user profile associated with the user. As another example, the digital magazine server receives a request to supplement the content item with additional content that identifies the content item or includes one or more characteristics of the content item. In some embodiments, the received request may request supplemental content for various content items presented by the digital magazine.

One or more topics associated with the identified content item are determined by the digital magazine server. A topic associated with the identified content item specifies a subject of the identified content item. If the identified content item includes text, topics associated with the content item may be determined by analyzing the frequency with which various words appear in the text. In the preceding example, the topics associated with the identified content item are words having highest frequencies of appearance or having at least a threshold frequency of appearance in the content item. Alternatively, a topic is a word associated with or representative of a group of words with which the topic is associated, and the frequency of the topic in a content item is a combined frequency of the words in the group of words associated with the topic. Topics having highest frequencies in the content item or having at least a threshold frequency in the content item are associated with the content item by the digital magazine server.

If a content item includes an image, topics associated with the content item may be determined based on image analysis techniques identifying an object or a feature in the image. Information associating topics with objects or features may be obtained by the digital magazine server to associate topics associated with objects or features identified in the image with the content item. Similarly, if a content item includes audio or video data, topics associated with words, phrases, objects, or features extracted from the audio or video data through any suitable method may be associated with the content item by the digital magazine server. If a content item includes multiple types of content (e.g., image data, text data, audio data, video data) topics associated with the content item may be determined by analyzing each of the types of content in the content item or by analyzing a set of types of content included in the content item.

In some embodiments, the digital magazine server also associates a score with a set of the topics associated with the identified content item or with each of the topics associated with the identified content item. A score associated with a topic represents prevalence of the topic in the identified content item. In some embodiments, the score of a topic is based on a frequency with which the topic occurs in the identified content item determined from the text analysis, image analysis, audio analysis, or other analysis used to determine the topics associated with the identified content item. For example the score associated with a topic is the frequency of the topic in the content item.

The score associated with a topic may also be based on information stored in a user profile associated with the user by the digital magazine server. For example, if the topic matches or is associated with an interest indicated by the user profile associated with the user, the digital magazine server increases the score associated with the topic. An interest of the user may be indicated by information stored in the user's user profile expressly identifying interests of the user, indicated by topics associated with at least a threshold number of content items with which the user previously interacted, indicated by topics associated with at least a threshold number of content items associated with the user, or indicated by any other suitable information associated with the user. In some embodiments, a number of additional content items maintained by the digital magazine server associated with a topic associated with the identified content item may be used to determine or to modify a score associated with the topic associated with the identified content item. For example, if a topic associated with the identified content item is also associated with at least a threshold number of percentage of content items maintained or obtained by the digital magazine server, the score associated with the topic is increased. As another example, a score associated with a topic associated with the identified content item is increased by a value based on a ratio of a number of content items obtained by the digital magazine server and associated with the topic to a number of content items obtained by the digital magazine server.

Based on the scores associated with the topics associated with the identified content items, the digital magazine server selects a topic associated with the identified content item. For example, topics associated with the identified content item are ranked based on their associated scores so a topic associated with the identified content item having higher scores have higher positions in the ranking. In various embodiments, the digital magazine server identifies a topic from the ranking, such as a topic having a highest position in the ranking or having at least a threshold position in the ranking. Alternatively, the digital magazine server identifies a topic associated with the identified content item having a maximum score. In other embodiments, the digital magazine server identifies a topic associated with the identified content item that is also associated with at least a threshold number of additional content items associated with the user or that is also associated with at least a threshold number of additional content items with which the user previously interacted.

The digital magazine server obtains one or more candidate content items associated with the identified topic. Topics are identified for various content items obtained by the digital magazine server as described above. Candidate content items may be obtained from one or more sources by the digital magazine server, from data stored by the digital magazine server, or from any suitable entity. In some embodiments, the candidate content items are content items associated with a time that is within a threshold time interval from a time when the identified content item was identified. Alternatively, additional content items associated with the identified topic are obtained from a specific source or from a specific set of sources by the digital magazine server. As an example, if the identified topic is a company, examples of additional content items include content items including current stock prices for the company, a content item identifying a product of the company, a content item identifying an additional company associated with the company, or a content item that is a news article discussing the company.

The digital magazine server selects a candidate content item from the one or more candidate content items based on relevance scores associated with various candidate content items. In some embodiments, the digital magazine server determines relevance scores for each candidate content item and selects a candidate content item based on the relevance scores. Alternatively, the digital magazine server determines relevance scores for a set of candidate content items and selects a candidate content item based on the relevance scores. The relevance score of a candidate content item provides a measure of similarity between the candidate content item and the identified content item. In one embodiment, a relevance score of a candidate content item is based on a frequency with which the identified topic occurs in the candidate content item, so candidate content items in which the identified topic more frequently occurs have higher relevance scores. Additional characteristics of a candidate content item may be used to determine a relevance score for the candidate content item. For example, a number of additional content items maintained by the digital magazine server associated with the identified topic may be used to determine or to modify a relevance score for the candidate content item. For example, if the additional topic associated with the identified content item is also associated with at least a threshold number or percentage of content items maintained or obtained by the digital magazine server, the relevance score associated with the candidate content item associated with the topic is increased. A type of content included in a candidate content item may also affect the relevance score of the candidate content item. For example, a candidate content item includes a flag or other data indicating it includes time-sensitive data (e.g., a stock quote, a sports score, a weather alert, etc.), which increases the relevance score of the candidate content item. Additionally, a source from which a candidate content item was obtained may modify the relevance score of a candidate content item. For example, a candidate content item obtained from a source associated with at least a threshold number of content items with which the user has previously interacted has an increased relevance score or the candidate content item's relevance score is directly correlated to an amount or a frequency of interaction by the user with other content items associated with the source from which the candidate content item was obtained. In some embodiments, the relevance score of a candidate content item is increased based on a number of additional topics associated with the candidate content item that match interests of the user.

In some embodiments, the digital magazine server ranks the candidate content items based on their relevance scores and selects a candidate content item based on the ranking. For example, a candidate content item having a highest position in the ranking or having at least a threshold position in the ranking is selected. Alternatively, a candidate content item having a highest relevance score is selected. In other embodiments, the digital magazine server selects a candidate content item based on timestamps associated with the candidate content items; for example, a candidate content item having a most recent timestamp is selected. Alternatively, the digital magazine server pseudo-randomly selects a candidate content item from the candidate content items.

The digital magazine server modifies the digital magazine presented to the user to present the selected candidate content item concurrently with the identified content item. In various embodiments, the digital magazine server presents the selected candidate content item proximate to the identified content item. For example, if the digital magazine server presents a portion of the identified content item in a content region of a page of a digital magazine, the selected candidate content item is presented in an additional content region adjacent to the content region. As another example, the digital magazine server presents a portion of the selected candidate content item or information identifying the selected candidate content item in a section of the content region presenting the identified content region, so the portion of the identified content item and the portion of the selected candidate content item or the information identifying the selected candidate content item are presented within a single content region. Information identifying the selected candidate content item may be a link or other visual indicator to a network address for retrieving the selected candidate content item.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
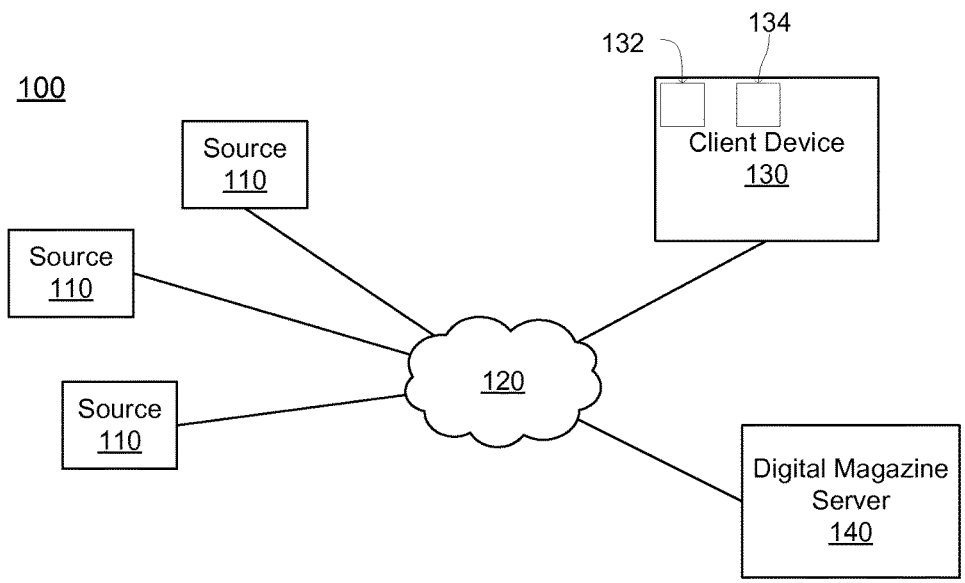
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) extensible markup language (XML) or JavaScript Object Notation (JSON). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
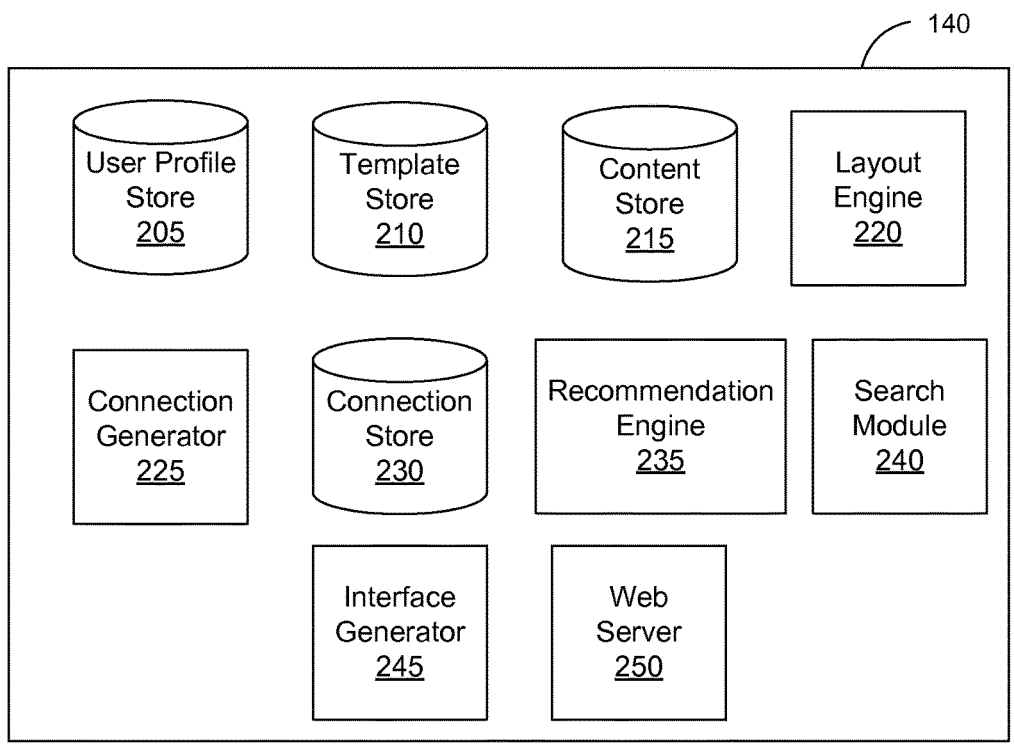
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represent various types of content. For example, the content store 215 stores content items received from one or more sources 110 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content store 215 along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187,840, filed on Jul. 21, 2011, which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, a the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

In various embodiments, the recommendation engine 235 selects and presents supplemental content in conjunction with a content item to increase the likelihood of the user interacting with the digital magazine or with the content item. The recommendation engine 235 identifies a content item included in a digital magazine for presentation to a user. For example, the recommendation engine 235 receives a request for supplemental content that identifies a content item or identifies characteristics of a content item and selects a content item having the identified characteristics. As another example, information identifying characteristics of a content item (e.g., topics, a source 110 associated with content items) are retrieved from a user profile associated with the user is retrieved by the recommendation engine 235, which identifies a content item having characteristics matching at least a threshold number of the identified characteristics. As further described below in conjunction with FIG. 4, the recommendation engine 235 determines one or more topics associated with the identified content item through application of one or more content extraction analysis methods to the identified content item. Scores for various topics associated with the identified content item are determined by the recommendation engine 235, where a score associated with a topic provides a measure of the prevalence of the topic in the identified content item. For example, a score for a topic is based on a frequency of the topic occurring in the identified content item, so topics occurring more frequently in the content item have higher scores. Based on the scores, the recommendation engine 235 identifies a topic associated with the identified content item. For example, the recommendation engine 235 ranks the topics based on their associated scores and identifies a topic having a highest position in the ranking. Candidate content items associated with the identified topic are obtained by the recommendation engine 235 from one or more sources 110, from the content store 210, or from any suitable entity. Based on characteristics of the candidate content items (e.g., a frequency with which the identified topic appears in candidate content items, types of content included in candidate content items, sources 110 associated with candidate content items, prior user interactions with content items having characteristics similar to candidate content items, etc.) the recommendation engine 235 determines relevance scores for various candidate content items, as further described below in conjunction with FIG. 4. The recommendation engine 235 selects one or more of the candidate content items based on the relevance scores and presents the selected one or more candidate content items concurrently with the identified content item, as further described below in conjunction with FIG. 4.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 110 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, JSON, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. In one embodiment, the digital magazine server 140 identifies a portion in an image that does not include content based on a measure of diversity of color associated with the portion of the image based on colors associated with pixels in the portion. For example, the layout engine 220 determines whether the portion of the image includes or does not include content based on the measure of diversity of color. In another embodiment, a digital magazine application executing on the client device 130 identifies the portion in the image without content based on the measure of diversity. Alternatively, the digital magazine server 140 and the client device 130 operate in conjunction with each other to identify a portion of the image that does not include content based on the measure of diversity of color for the portion. For example, certain functionality (e.g. identifying the portion of the image) is performed by the digital magazine server 140, while other functionality (e.g., presenting portions of the image including content) is performed by a digital magazine application executing on the client device 130.

Page Templates

Figure 3:
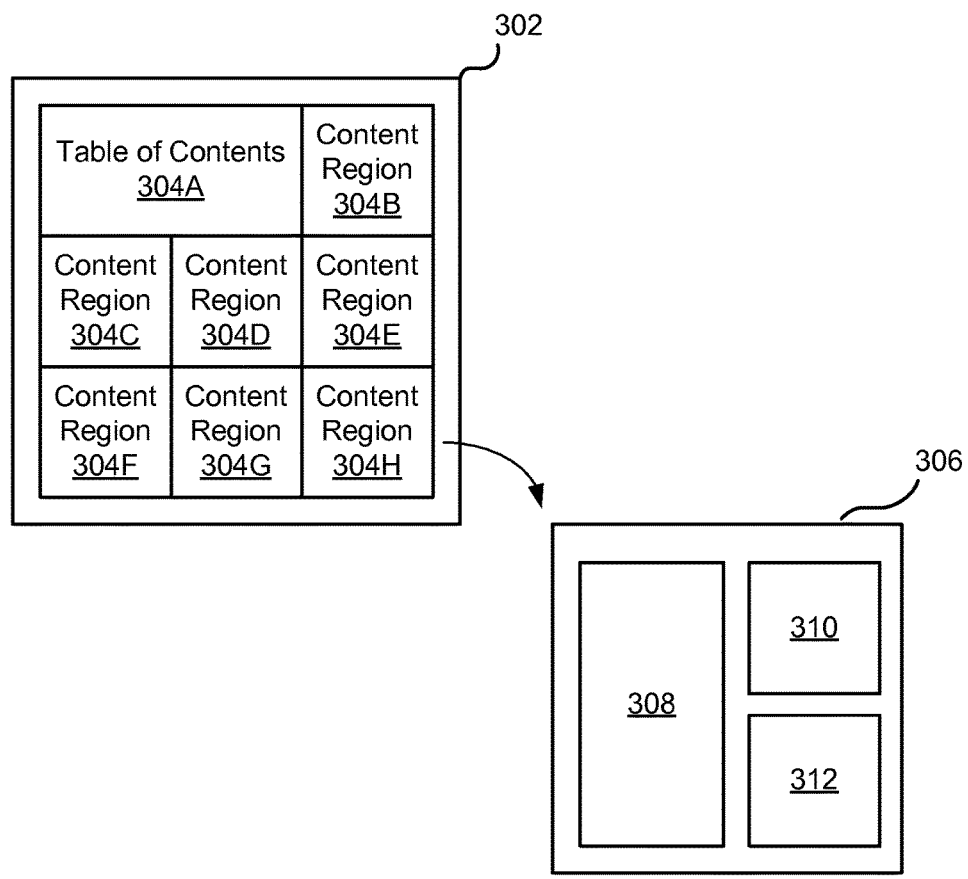
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Figure 4:
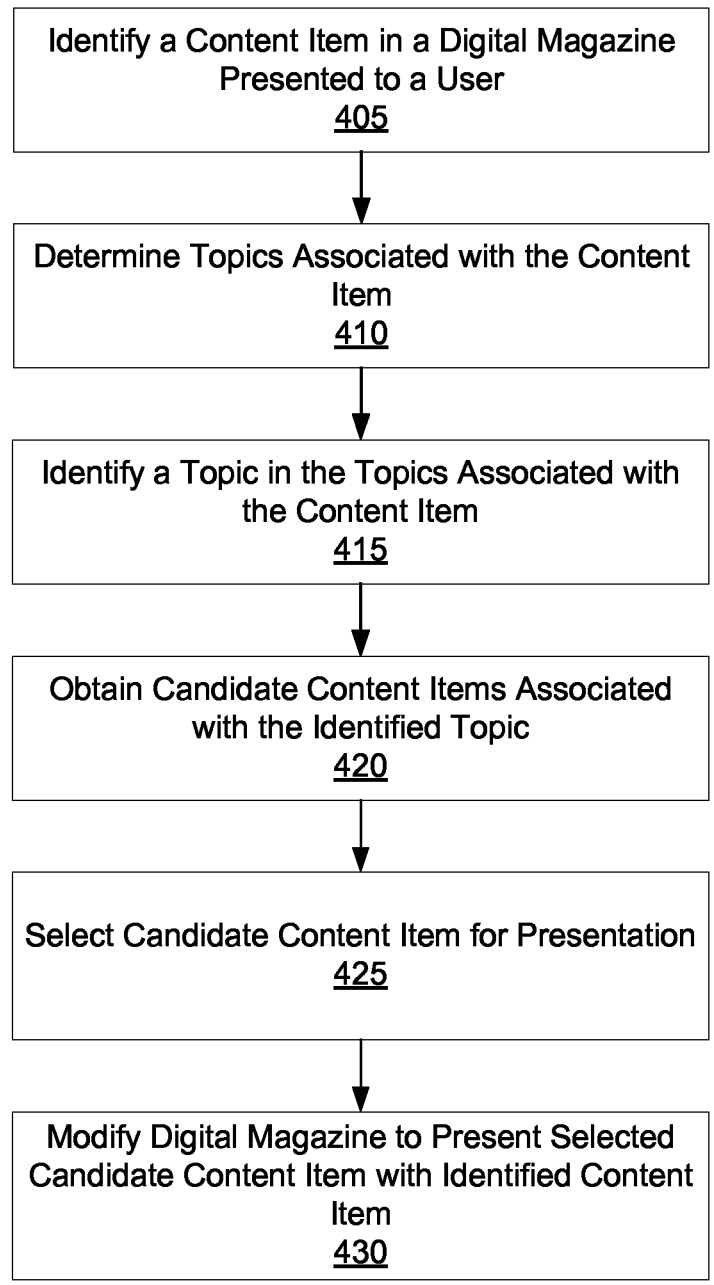
FIG. 4 is a flowchart of a method for selecting supplemental content to present in conjunction with an identified content item, in accordance with an embodiment of the invention.

Selecting Supplemental Content for Presentation in Conjunction with an Identified Content Item FIG. 4 is a flowchart of one embodiment of a method for supplemental content to present in conjunction with an identified content item. In other embodiments, the method may include different and/or additional steps than those shown in FIG. 4. The functionality described in conjunction with the digital magazine server 140 in FIG. 4 may be provided by the recommendation engine 235 in one embodiment or may be provided by any other suitable component, or components, in other embodiments. Alternatively, the client device 130 executes one or more instructions associated with the digital magazine server 140, such as an application associated with the digital magazine server 140, to provide the functionality described in conjunction with FIG. 4.

The digital magazine server 140 identifies 405 a content item in a digital magazine provided by the digital magazine server 140 for presentation to a user of the digital magazine server 140. In some embodiments, the digital magazine server 140 retrieves information from a user profile associated with the user by the digital magazine server 140 describing one or more characteristics of the user or characteristics of one or more content items with which the user previously interacted. For example, the digital magazine server 140 identifies 405 a content item in the digital magazine provided to the user having at least a threshold number of characteristics matching characteristics of content items with which the user has previously interacted or having at least a threshold number of characteristics matching content items associated with the user (e.g., content items provided to the digital magazine server 140 by the user, content items presented to the user by the digital magazine server 140). As another example, the digital magazine server 140 identifies 405 a content item in the digital magazine associated with at least a threshold number of topics matching, or associated with, an interest of the user identified by the user profile. Alternatively, the digital magazine server 140 receives a request from the user to supplement a content item in a digital magazine presented to the user by the digital magazine server 140 that identifies the content item (e.g., that includes an identifier associated with the content item). In other embodiments, the request includes one or more characteristics and the digital magazine server 140 identifies 405 a content item having at least a threshold number of characteristics matching the characteristics in the request. The request includes a user identifier identifying the user of the digital magazine server 140 in various embodiments.

One or more topics associated with the identified content item are determined 410 by the digital magazine server 140. A topic associated with the content item identifies a subject of the identified content item. One or more topic extraction methods are applied to the identified content item by the digital magazine server 140 to determine 410 the one or more topics associated with the identified content item. If the identified content item includes text, the digital magazine server 140 may determine 410 topics associated with the content item by analyzing the frequency with which various words appear in the text of the identified content item. In the preceding example, the topics associated with the identified content item are words having highest frequencies of appearance or having at least a threshold frequency of appearance in the content item. In other embodiments, a topic is a word associated with or representative of a group of words with which the topic is associated, and the frequency of the topic in a content item is a combined frequency of the words in the group of words associated with the topic. For example, a group of words includes "apple," "orange," "banana," and "strawberry" associated with a topic of "fruit." So, the frequency of "fruit" in a content item is a combination of the frequencies with which "apple," "orange," "banana," and "strawberry" occur in the content item. As another example, the group of words includes "water" and "$H_2O$," which are associated with a topic of "water." Hence, the frequency of the topic "water" in a content item is a combination of the frequencies with which "water" and "$H_2O$" occur in the content item. Topics having highest frequencies in the content item or having at least a threshold frequency in the content item are determined 410 to be associated with the content item by the digital magazine server 140.

If the identified content item includes an image, one or more topics associated with the identified content item may be determined 410 based on image analysis techniques such as object recognition, image segmentation, or any other suitable image processing algorithm that can identify an object or feature in the image. Information associating topics with objects or features may be obtained by the digital magazine server to associate topics associated with objects or features identified in the image with the identified content item. Similarly, if the identified content item includes audio or video data, the digital magazine server 140 determines 410 one or more topics associated with the identified content item based on words, phrases, objects, or features extracted from the audio or video data through any suitable method. If the identified content item includes multiple types of content (e.g., image data, text data, audio data, video data), the digital magazine server 140 determines 410 one or more topics associated with the identified content item by analyzing each of the types of content in the identified content item or by analyzing a set of types of content included in the identified content item.

Additionally, the digital magazine server 140 determines a score for various topics associated with the identified content item. In various embodiments, the digital magazine server 140 determines a score for each of the topics associated with the identified content item. Alternatively, the digital magazine server 140 determines scores for a set of the topics associated with the identified content item. A score associated with a topic represents prevalence of the topic in the identified content item. In some embodiments, the score of a topic is based on a frequency with which the topic occurs in the identified content item determined from the text analysis, image analysis, audio analysis, or other analysis used to determine the topics associated with the identified content item. For example, the score associated with a topic is the frequency of the topic in the content item. In some embodiments, the score associated with a topic is based in part on a type of analysis used to determine frequency of the topic in the identified content item. For example, a score of a topic identified via text analysis is increased relative to a score of an additional topic identified through image analysis.

The score associated with a topic may also be based on information stored in a user profile associated with the user by the digital magazine server 140. For example, if the topic matches or is associated with an interest indicated by the user profile associated with the user, the digital magazine server 140 increases the score associated with the topic. An interest of the user may be indicated by information stored in the user's user profile expressly identifying interests of the user, indicated by topics associated with at least a threshold number of content items with which the user previously interacted, indicated by topics associated with at least a threshold number of content items associated with the user, or indicated by any other suitable information associated with the user. An interest of the user may also be determined from interests or other information identified by user profiles associated with additional users having at least a threshold number of characteristics (e.g., content items associated with the user and with the additional users, interactions performed by the user and by the additional users, content items provided to the digital magazine server 140 by the user and by the additional users, etc.). In some embodiments, a number of additional content items maintained by the digital magazine server 140 associated with a topic associated with the identified content item may be used to determine or to modify a score associated with the topic associated with the identified content item. For example, if a topic associated with the identified content item is also associated with at least a threshold number of percentage of content items maintained or obtained by the digital magazine server 140, the score associated with the topic is increased. As another example, the digital magazine server 140 increases a score associated with a topic associated with the identified content item by a value based on a ratio of a number of content items obtained by the digital magazine server 140 and associated with the topic to a number of content items obtained by the digital magazine server 140.

Based at least in part on the scores associated with the various topics, the digital magazine server 140 identifies 415 a topic associated with the content item. For example, the digital magazine server 140 ranks topics associated with the identified content item based on their associated scores so a topic associated with the identified content item having higher scores have higher positions in the ranking. In various embodiments, the digital magazine server 140 identifies 415 a topic having a highest position in the ranking or having at least a threshold position in the ranking as associated with the identified content item. Alternatively, the digital magazine server 140 identifies 415 a topic associated with the identified content item having a maximum score. In other embodiments, the digital magazine server 140 identifies 415 a topic associated with the identified content item as a topic that is also associated with at least a threshold number of additional content items associated with the user or as a topic that that is also associated with at least a threshold number of additional content items with which the user previously interacted. If additional content items associated with the user or additional content items with which the user interacted are used to identify 415 the topic associated with the identified content items, additional content items having specific characteristics (e.g., additional content items associated with a specific time interval, additional content items associated with one or more specific sources 110, additional content items with which the user performed one or more specific types of interactions, etc.) are used. If at least a threshold number of the additional content items are associated with a topic matching a topic associated with the identified content item, the topic is identified 415.

The digital magazine server 140 obtains 420 one or more candidate content items that are each associated with the identified topic. Topics are identified for various content items obtained by the digital magazine server 140 as described above, and the digital magazine server 140 selects content items associated with the identified topic as candidate content items. In some embodiments, a source 110 associates one or more topics with a content item, and the digital magazine server 140 obtains 420 content items with which the source 110 associated the identified topic as candidate content items. Candidate content items may be obtained 420 from various sources 110, from data maintained by the digital magazine server 140, or from any suitable entity or combination of entities. In some embodiments, the candidate content items are content items associated with a time that is within a threshold time interval from a time when the identified content item was identified. Alternatively, additional content items associated with the identified topic are obtained 420 from a specific source 110 or from a specific set of sources 110 by the digital magazine server 140.

As an example, if the identified topic is a company, examples of additional content items include content items including current stock prices for the company, a content item identifying a product of the company, a content item identifying an additional company associated with the company, or a content item that is a news article discussing the company. In another example, if the identified topic is a sports team, the obtained content item includes scores for games involving the sports team, statistics for one or more players on the sports team, and other information about the sports team, players of the sports team, or entities associated with the sports team. In some embodiments, candidate content items associated with one or more topics associated with the identified content item are obtained 420. For example, candidate content items associated with one or more topics having at least a threshold position in a ranking of the topics associated with the identified content item. For example, if topics of a specific company and a specific sports team have at least a threshold position in the ranking of topics associated with the identified content item, the obtained candidate content items include stock prices for the company and scores for the sports team.

The digital magazine server 140 selects 425 a candidate content item from the one or more candidate content items for presentation. In various embodiments, the digital magazine server 140 determines relevance scores for various candidate content items and selects 425 the candidate content item based on the relevance scores. For example, the digital magazine server 140 determines a relevance score for each candidate content item. As another example, the digital magazine server 140 determines a relevance score for each of a set of the candidate content items. A relevance score for a candidate content item provides a measure of similarity between the candidate content item and the identified content item. In one embodiment, a relevance score of a candidate content item is based on a frequency with which the identified topic occurs in the candidate content item, so candidate content items in which the identified topic more frequently occurs have higher relevance scores.

Additional characteristics of a candidate content item may be used to determine a relevance score for the candidate content item. For example, a number of additional content items maintained by the digital magazine server 140 associated with the identified topic may be used to determine or to modify a relevance score for the candidate content item. For example, if the additional topic associated with the identified content item is also associated with at least a threshold number of percentage of content items maintained or obtained by the digital magazine server 140, the relevance score of a candidate content item associated with the topic is increased. A type of content included in a candidate content item may also affect the relevance score of the candidate content item. For example, a candidate content item includes a flag or other data indicating the candidate content item includes time-sensitive data (e.g., a stock quote, a sports score, a weather alert, etc.), causing the digital magazine server 140 to increase the relevance score of the candidate content item. Additionally, a source 110 from which a candidate content item was obtained may modify the relevance score of the candidate content item. For example, a candidate content item obtained from a source 110 associated with at least a threshold number of content items with which the user has previously interacted has an increased relevance score or the candidate content item's relevance score is directly correlated to an amount or a frequency of interaction by the user with other content items associated with the source from which the candidate content item was obtained. In some embodiments, the relevance score of a candidate content item is increased based on a number of additional topics associated with the candidate content item that match interests of the user.

In some embodiments, the digital magazine server 140 ranks the candidate content items based on their relevance scores and selects 425 a candidate content item based on the ranking. For example, a candidate content item having a highest position in the ranking or having at least a threshold position in the ranking is selected 425. Alternatively, a candidate content item having a highest relevance score is selected 425. Alternatively, the candidate content item is selected 425 based on a number or percentage of topics associated with the identified content item and various candidate content items. For example, a candidate content item associated with a maximum (or at least a threshold) number or associated with a maximum (or with at least a threshold) percentage of topics matching topics associated with the identified candidate content item is selected 425. In other embodiments, the digital magazine server 140 selects 425 a candidate content item based on timestamps associated with the candidate content items; for example, a candidate content item having a most recent timestamp is selected 425. Alternatively, the digital magazine server 140 pseudo-randomly selects 425 a candidate content item from the candidate content items.

The digital magazine server 140 modifies 430 the digital magazine presented to the user so the selected candidate content item is presented concurrently with the identified content item. In various embodiments, the digital magazine server 140 presents the selected candidate content item in the digital magazine so the selected candidate content item is proximate to the identified content item. For example, if the digital magazine server 140 presents a portion of the identified content item in a content region of a page of a digital magazine, the selected candidate content item is presented in an additional content region adjacent to the content region. As another example, the digital magazine server 140 presents a portion of the selected candidate content item or information identifying the selected candidate content item in a section of the content region presenting the identified content region, so the portion of the identified content item and the portion of the selected candidate content item or the information identifying the selected candidate content item are presented within a single content region. Information identifying the selected candidate content item may be a link or other visual indicator (e.g., an image, a video, etc.) to a network address for retrieving the selected candidate content item. In some embodiments, a portion of the selected candidate content item or the candidate content item is presented when the user performs a type of interaction with the identified content item presented via the digital magazine. For example, if the user hovers over a location within the content region presenting the identified content item for at least a threshold length of time, a link or a visual indicator describing the selected candidate content item is presented in a pop-up window or a thumbnail representation of the selected candidate content item is presented.

In some embodiments, multiple content items are identified 405, and the steps described above in conjunction with FIG. 4 are performed for the multiple content items to select a candidate content item for presentation with each of the multiple content items or with each of a set of the multiple content items. This allows the digital magazine server 140 to present supplemental content in conjunction with various content items included in a digital magazine to improve user interaction with the digital magazine. In some embodiments, the user profile associated with the user by the digital magazine server 140 includes information identifying a number of content items for which candidate content items are selected 425 or types of content items for which candidate content items are selected 425.

While FIG. 4 describes selection of a candidate content item for presentation in a digital magazine along with a content item, the method described in conjunction with FIG. 4 may be used to select candidate content items for presentation with a content item presented via any suitable method. For example, if a feed including a series of multiple content items each presented in different positions is presented to a user, a content item may be identified 405 from the feed and the steps described above in conjunction with FIG. 4 performed to select 425 a candidate content item for presentation in the feed along with the identified content item. In the preceding example, the selected candidate content item is presented in a portion of the position in the feed in which the identified content item is presented or is presented in a position of the feed adjacent to a position of the feed in which the identified content item is presented.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   identifying a content item included in a digital magazine provided by a digital magazine server for presentation to a user of the digital magazine server;
   determining one or more topics associated with the content item by determining frequencies with which various words associated with one or more of the topics appear in the content item and determining the one or more topics based on the frequencies;
   identifying a topic from the one of the one or more topics associated with the content item by determining a score associated with each of the one or more topics associated with the content item, the score associated with a topic determined based on a frequency with which one or more words associated with the topic occurs in the content item, and identifying the topic based at least in part on the scores;
   obtaining a set of candidate content items, each of the candidate content items associated with the identified topic and supplemental to content items included in the digital magazine;
   determining relevance scores associated with each candidate content item in the set of candidate content items based on characteristics of the candidate content item, a relevance score associated with a candidate content item based on a frequency with which one or more words associated with the identified topic occur in the candidate content item;
   selecting a candidate content item based at least in part on the determined relevance scores; and
   modifying the digital magazine to include the selected candidate content item for presentation concurrently with the content item.

2. The method of claim 1, wherein identifying the topic based at least in part on the scores comprises:
   identifying a topic associated with a maximum score.

3. The method of claim 1, wherein identifying the topic based at least in part on the scores comprises:
   ranking the one or more topics based at least in part on the scores; and
   identifying a topic having a threshold position in the ranking.

4. The method of claim 1, wherein the relevance score associated with a candidate content item is further based on a type of content included in the candidate content item.

5. The method of claim 4, wherein the type of content included in the candidate content item indicates whether the candidate content item includes time-sensitive data.

6. The method of claim 5, wherein the relevance score associated with the candidate content item is higher if the type of content included in the candidate content item indicates the candidate content item includes time-sensitive data.

7. The method of claim 1, wherein the relevance score associated with the candidate content item is further based on a source associated with the candidate content item.

8. The method of claim 1, wherein selecting the candidate content item based at least in part on the determined relevance scores comprises:
   ranking the candidate content items in the set of candidate content items based at least in part on the determined relevance scores; and
   selecting a candidate content item having at least a threshold position in the ranking.

9. The method of claim 1, wherein selecting the candidate content item based at least in part on the determined relevance scores comprises:
   selecting a candidate content item associated with a maximum relevance score.

10. The method of claim 1, wherein modifying the digital magazine to include the selected candidate content item for presentation concurrently with the content item comprises:
    identifying a content region of the digital magazine in which the content item is presented; and
    presenting information identifying the selected candidate content item in a portion of the content region in which the content item is presented.

11. The method of claim 10, wherein the information identifying the selected candidate content item comprises a link to retrieve the candidate content item.

12. A computer program product comprising a non-transitory computer-readable storage medium having instructions encoded thereon that, when executed by a processor, cause the processor to:
    identify a content item included in a digital magazine provided by a digital magazine server for presentation to a user of the digital magazine server;
    determine one or more topics associated with the content item by determining frequencies with which various words associated with one or more of the topics appear in the content item and determining the one or more topics based on the frequencies;

identify a topic from the one of the one or more topics associated with the content item by determining a score associated with each of the one or more topics associated with the content item, the score associated with a topic determined based on a frequency with which one or more words associated with the topic occurs in the content item, and identifying the topic based at least in part on the scores;

obtain a set of candidate content items, each of the candidate content items associated with the identified topic and supplemental to content items included in the digital magazine;

determine relevance scores associated with each candidate content item in the set of candidate content items based on characteristics of the candidate content item, by determining a relevance score associated with each candidate content item based on a frequency with which one or more words associated with the identified topic occur in the candidate content item;

select a candidate content item based at least in part on the determined relevance scores; and modify the digital magazine to include the selected candidate content item for presentation concurrently with the content item.

13. The computer program product of claim 12, wherein identify the topic based at least in part on the scores comprises:

rank the one or more topics based at least in part on the scores; and identify a topic having a threshold position in the ranking.

14. The computer program product of claim 12, wherein the relevance score associated with the candidate content item is further based on a type of content included in the candidate content item.

15. The computer program product of claim 12, wherein select the candidate content item based at least in part on the determined relevance scores comprises:

rank the candidate content items in the set of candidate content items based at least in part on the determined relevance scores; and select a candidate content item having at least a threshold position in the ranking.

16. The computer program product of claim 12, wherein modify the digital magazine to include the selected candidate content item for presentation concurrently with the content item comprises:

identify a content region of the digital magazine in which the content item is presented; and present information identifying the selected candidate content item in a portion of the content region in which the content item is presented.

* * * * *